United States Patent [19]
Matsuzawa et al.

[11] Patent Number: 5,896,662
[45] Date of Patent: Apr. 27, 1999

[54] MULTI-LAYER STRUCTURE ROLLER AND A METHOD FOR PRODUCING THE SAME

[75] Inventors: Kouzaburo Matsuzawa, Tokyo; Atsushi Fujii, Himeji, both of Japan

[73] Assignee: Idemitsu Petrochemical Co., Ltd., Tokyo, Japan

[21] Appl. No.: 08/950,216

[22] Filed: Oct. 14, 1997

Related U.S. Application Data

[62] Division of application No. 08/707,644, Sep. 5, 1996.

[30] Foreign Application Priority Data

Sep. 13, 1995 [JP] Japan .................................. 7-235181
Sep. 13, 1995 [JP] Japan .................................. 7-235182

[51] Int. Cl.$^6$ ...................................................... B23P 15/00
[52] U.S. Cl. .......................... 29/895.21; 29/895.2; 492/54
[58] Field of Search .................................. 492/54, 58, 53, 492/49; 29/446, 447, 895.2, 895.21

[56] References Cited

U.S. PATENT DOCUMENTS

| | | |
|---|---|---|
| 21,039 | 7/1858 | Waterman . |
| 2,964,251 | 12/1960 | Samuels et al. . |
| 4,793,042 | 12/1988 | Easter .......................................... 29/447 |
| 5,093,974 | 3/1992 | Ginzburg ..................................... 29/447 |
| 5,155,909 | 10/1992 | Murray et al. ...................... 29/895.212 |
| 5,359,773 | 11/1994 | Nagai ................................. 29/895.212 |
| 5,524,342 | 6/1996 | Swain et al. ........................ 29/895.212 |
| 5,564,196 | 10/1996 | Nomura et al. ............................. 492/54 |
| 5,647,279 | 7/1997 | Johner et al. .............................. 492/54 |

*Primary Examiner*—D Cuda
*Attorney, Agent, or Firm*—Flynn, Thiel, Boutell & Tanis, P.C.

[57] ABSTRACT

A multi-layer structure roller is a muti-layer structure composed of a tubular-shaped metal-made outer cylinder section located at the outer-most position, a tubular-shaped metal-made middle cylinder section located on the inside of the outer cylinder section, and an tubular-shaped metal-made inner cylinder section located on the inside of the middle cylinder section, in which coefficient of linear expansion of the middle cylinder section is greater than the coefficient of linear expansion of the outer cylinder section, the outer cylinder section and the middle cylinder section are coupled by using the difference in heat-expansion caused by heating both cylinder sections in the state sandwiching an elastic body between both cylinder sections to be laminated, tapers are respectively provided at the inner circumference of the middle cylinder section and the outer circumference of the inner cylinder section to fit the taper of the middle cylinder section, certainly coupled with the outer cylinder section to sandwich the elastic body by expanding with heating, the taper of the inner cylinder section, being in the cooling shrinking state or the room-temperature state, and further, the middle cylinder section and the inner cylinder section are combined in the fitted state of the tapers with prevention from shrinkage caused when the middle cylinder section is changed to the room-temperature. The middle cylinder section can be attached onto the outer circumference surface with an elastic body.

2 Claims, 6 Drawing Sheets

MULTI-LAYER STRUCTURE ROLLER AND A METHOD FOR PRODUCING THE SAME

This is a division of Ser. No. 08/707,644, filed Sep. 5, 1996.

BACKGROUND OF THE INVENTION

1. Field of the Invention

This invention relates to a multi-layer structure roller and a method for producing the same, which is capable of being used for forming a roller used in order to carry out a polishing (gloss) process or an embossing (grained pattern) process on the surface of a thermoplastic resin sheet (or film) or a roller in order to make a film of an extremely thin film.

2. Description of the Related Art

Conventionally, when making or processing a film of a thermoplastic resin sheet (or film), especially, when forming a sheet by cool-caking the melted or softened resin film, and simultaneously, carrying out a polishing (gloss) process or an embossing (grained pattern) process, a rubber roller and a metal roller formed with a mirror face or an emboss face (a face having an asperities pattern) are used generally.

FIG. 6 shows a general situation when the process is carried out by using a metal roller 80 and a rubber roller 81 as described above. In the case of FIG. 6, a demineralizing-range or melted sheet is pressed between the metal roller 80 and the rubber roller 81 to be pressed with each of rollers 80 and 81, thereby the emboss pattern or polishing on the surface of the metal roller 80 is transferred onto the sheet 82. At this time, the rubber roller 81 is deformed elastically, whereby a surface-rolled area 84 formed by the metal roller 80 and the rubber roller 81, which sandwich the sheet 82, is to be surface-rolled.

The case of FIG. 6 has the following advantage. That is, generally, when the sheet is transferred by pressing between a combination of the higher-degree metal roller and the metal roller, the surface-rolled consists only of lines, whereby the transfer is not sufficient. However, in the case of FIG. 6, the surface-rolled area 84 is to be rolled because of the elastic deformation of the rubber roller, resulting in sufficient transfer.

As shown in FIG. 7, the process may be carried out by providing a metal-made endless belt 92 between a metal roller 90 and rubber roller 91. In FIG. 7, the metal-made endless belt 92 is wound and hitched between the rubber roller 91 and a cooling roller 93, in which the surface of the endless belt 92 is a mirror face or an emboss face. A sheet 94 is pressed between the rubber roller 91, wound with the endless belt 92, and the metal roller 90, having the mirror face or the emboss face. The endless belt 92, wound on the rubber roller 91, and the metal roller 90 are pressed on the sheet 94 to transfer the polishing or the emboss pattern on the metal roller 90 or the endless belt 92 onto the sheet. At this time, the rubber roller 91 is elastically deformed, with the result that a surface-rolled area 95, formed between the metal roller 90 and the endless belt 92 (the rubber roller 91) in the state that the sheet 94 is sandwiched between them, is to be surface-rolled. Therefore, the case shown in FIG. 7 has an advantage of obtaining sufficient transfer.

However, when the process is carried out by using the metal roller 80 and the rubber roller 81 as shown in FIG. 6, produces a disadvantage whereby the surface of the sheet 82 rolled with the rubber roller 81 becomes rough. Further, another disadvantage is produced, in which the sheet 82 is crumpled by increasing the temperature of the rubber roller 81, namely, deficiency by exfoliation of the sheet.

When the process is carried out by using the endless belt 92 as shown in FIG. 7, for the endless belt 92 as an intermediate, the sheet 94 and the rubber roller 91 are not directly rolled, resulting in no disadvantages such as deficiency by exfoliation or the rough face as shown in FIG. 6.

The method used for carrying out the process using the endless belt 92 as the intermediate is an extremely effective method, however, the method produces a disadvantage in that the apparatus increases in complexity and cost. Further, another disadvantage, a snake-inhibiting device for preventing the endless belt 92 from snaking, is needed. And still another disadvantage, the device has to be larger in order to increase the endurance of the endless belt 92.

It is extremely difficult to process the aforementioned precision emboss process (the emboss of about 10–100 $\mu$) onto the metal roller or the surface of a metal plate. In some cases, only engraving onto the small area (e.g., 9 inch×9 inch) of the metal plate is possible, therefore, the engraved metal plate is used as a transferring plate or as an original plate of a replica in order to be used as the transferring plate replicated by, for example, electro-forming (a sculpturing method for correctly replicating the same metal model as the original plate by applying electroplated coatings).

The aforementioned transferring plates are all flat plates, thereby the micro-emboss sheet should be produced with use of a batch type of, for example, vacuum press, resulting in the disadvantage of critically low productivity.

As a consequence, in order to dramatically increase the productivity of the micro emboss sheet, a method has been required, in which the transferring plate of the flat plate is processed to a roller-shape to securely form a required micro emboss roller.

SUMMARY OF THE INVENTION

A multi-layer structure roller according to the present invention is characterized by including an tubular-shaped metal-made outer cylinder section located at the outer-most side; an tubular-shaped metal-made middle cylinder section located on the inside of the outer cylinder section; and an tubular-shaped metal-made inner cylinder section located on the inside of the middle cylinder section, in which the middle cylinder section has a greater coefficient of linear expansion than the outer cylinder section, the outer cylinder section and the middle cylinder section are coupled by using the difference in heat-expansion caused by heating both the cylinder sections in the laminated state, tapers are respectively provided at the inner circumference of the middle cylinder section and the outer circumference of the inner cylinder section to fit the taper of the middle cylinder section, certainly coupled with the outer cylinder section to sandwich the elastic body by expanding with heating, the taper of the inner cylinder section, being in the cooling shrinking state or the room-temperature state, and further, the middle cylinder section and the inner cylinder section are combined in the fitted state of the tapers with prevention from shrinkage caused when the middle cylinder section is changed to room-temperature (that is, while the coupled state of the middle cylinder section and the outer cylinder section remains).

In the present invention as described thus far, the outer cylinder section, the middle cylinder section and the inner cylinder section, which compose each layer of the circular section, are securely combined, resulting in the formation of the multi-layer structure roller of the high quality and high dependability, which is produced without any disadvantages that the combination of each cylinder section is disjoined during use.

The combination is caused by using the expansion and the shrinkage of each component, so that any extra member for joining, such as a bolt, a screw or the like, is unnecessary, resulting in the simplification of the roller structure.

The tapers are respectively provided at the inner circumference of the middle cylinder section and the outer circumference of the inner cylinder section, so that the inner cylinder section can be smoothly inserted into the inside of the middle cylinder section, resulting in the easy production of the roller.

In the aforementioned invention, providing the tubular-shaped elastic body between the outer cylinder section and the middle cylinder section, when the pressing force is inacted from the outer circumference side to the multi-layer structure roller, the elastic body is elastically deformed, simultaneously, the outer cylinder section is deformed along with the deformation of the elastic body, therefore, the surface rolled between the multi-layer structure roller and the surface-rolled subject (e.g., a sheet or a film when the multi-layer structure roller is used for making a film or processing for a thermoplastic resin sheet or film) is possible.

In the multi-layer structure roller according to the present invention, a cooling means may be provided as necessary.

Incidentally, if the elastic body has metal powder added, thermal conductivity of the elastic body can be increased.

As a consequence, for example, when the multi-layer structure roller of the present invention is used for making a film or processing for the thermoplastic resin sheet, the polishing or the emboss pattern on the surface of the outer cylinder section of the multi-layer structure roller (or the polishing or the emboss pattern on the surface of the metal roller located to pair with the multi-layer structure roller) is sufficiently transferred on the sheet, otherwise the high-speed making film for a thin film is possible, with the result that the thermoplastic resin sheet is securely made and processed.

At the outer-most side of the multi-layer structure roller, the outer cylinder section is provided, so that the surface-rolled subject is rolled with the outer cylinder section, and not directly rolled with the elastic body, resulting in the inhibition of producing a rough face of the surface-rolled subject and solution of the disadvantage of deficient by exfoliation of the surface-rolled subject, caused by increasing temperature of the elastic body, by cooling with the cooling means.

Therefore, for example, when the multi-layer structure roller of the present invention is used for making a film or processing the thermoplastic resin sheet, as shown in FIG. 6, a disadvantage whereby the surface-rolled face is rough by directly rolling the sheet 82 to the rubber roller 81, and a further disadvantage whereby the sheet 82 is crumpled by increasing the temperature of the rubber roller 81, are resolved.

Further, as compared with the process of using the aforementioned endless belt 92 in an intermediate state as shown in FIG. 7, the simplification, smaller-sized, and lower-cost of the device can be attained, furthermore, a tension adjustment device or a snake-inhibiting device for prevention from snaking the endless belt 92 is not needed. From view of the needless use of the endless belt 92, the improved endurance of the device and the improved efficient process and film-making are attained.

In the case of carrying out the polishing process on the thermoplastic resin sheet by using the multi-layer structure roller of the present invention, it is advisable that the outer cylinder section is made of stainless and the circumference surface of the outer cylinder section is formed to be a seamless surface or a mirror face. By the aforementioned structure, a production-piece of high quality sheet, securely transferred thereon with the polishing on the surface of the outer cylinder section, is obtained.

In the case of carrying out the emboss process on the thermoplastic resin sheet by using the multi-layer structure roller of the present invention, it is advisable that the outer cylinder section is formed to be tubular-shaped by welding two mutually opposed sides of the metal-made emboss plate. By the aforementioned structure, a production-piece of high quality sheet securely transferred thereon with the emboss pattern on the surface of the outer cylinder section is obtained.

Further, it is advisable that a disjoin-inhibiting ring for preventing the inner cylinder section from disjoining, having a female screw, is provided at the end portion of the smaller inner diameter of the middle cylinder, and a disjoin-inhibiting screw groove portion, having a male screw engaging the female screw of the disjoin-inhibiting ring, is provided at the end portion of the side of the smaller outer diameter of the inner cylinder section. According to the aforementioned structure, the coupling force is adjusted, and the disjoin of the inner cylinder section from the middle cylinder section is further securely prevented, resulting in further improved quality and dependability of the multi-layer structure roller.

A method for producing the multi-layer structure roller according to the present invention is characterized by including the steps of: inserting an tubular-shaped middle cylinder section, having a greater coefficient of linear expansion than an outer cylinder section, into the inside of the tubular-shaped metal-made outer cylinder section located at the outer-most side; securely coupling the outer cylinder section and the middle cylinder section by using the difference in heat expansion caused when the outer cylinder section and the middle cylinder section are heated in the laminated state; providing tapers at the inner circumference of the middle cylinder section and at the outer circumference of an inner cylinder section, being an tubular-shaped inner cylinder section and ready to be inserted into the inside of the middle cylinder section; defining the position of the tapers to fit the taper of the middle cylinder section coupled with the outer cylinder section by expanding with heating and the taper of the inner cylinder section being in the cooling shrinking state or the room-temperature state; and combining the middle cylinder section and the inner cylinder section with prevention from shrinkage caused when the middle cylinder section is changed to room-temperature, in the fitted state of the tapers.

In the producing method, when the multi-layer structure roller has the elastic body, the elastic body is attached on the outer circumference surface of the middle cylinder section; and the outer cylinder section and the middle cylinder section are coupled by using the difference in heat expansion caused by heating both cylinder sections sandwiching the elastic body.

DETAILED DESCRIPTION OF THE PREFERRED EMBODIMENT(S)

First Embodiment

A first embodiment according to the present invention will be explained below in detail with reference to the attached drawings.

Figure 1:
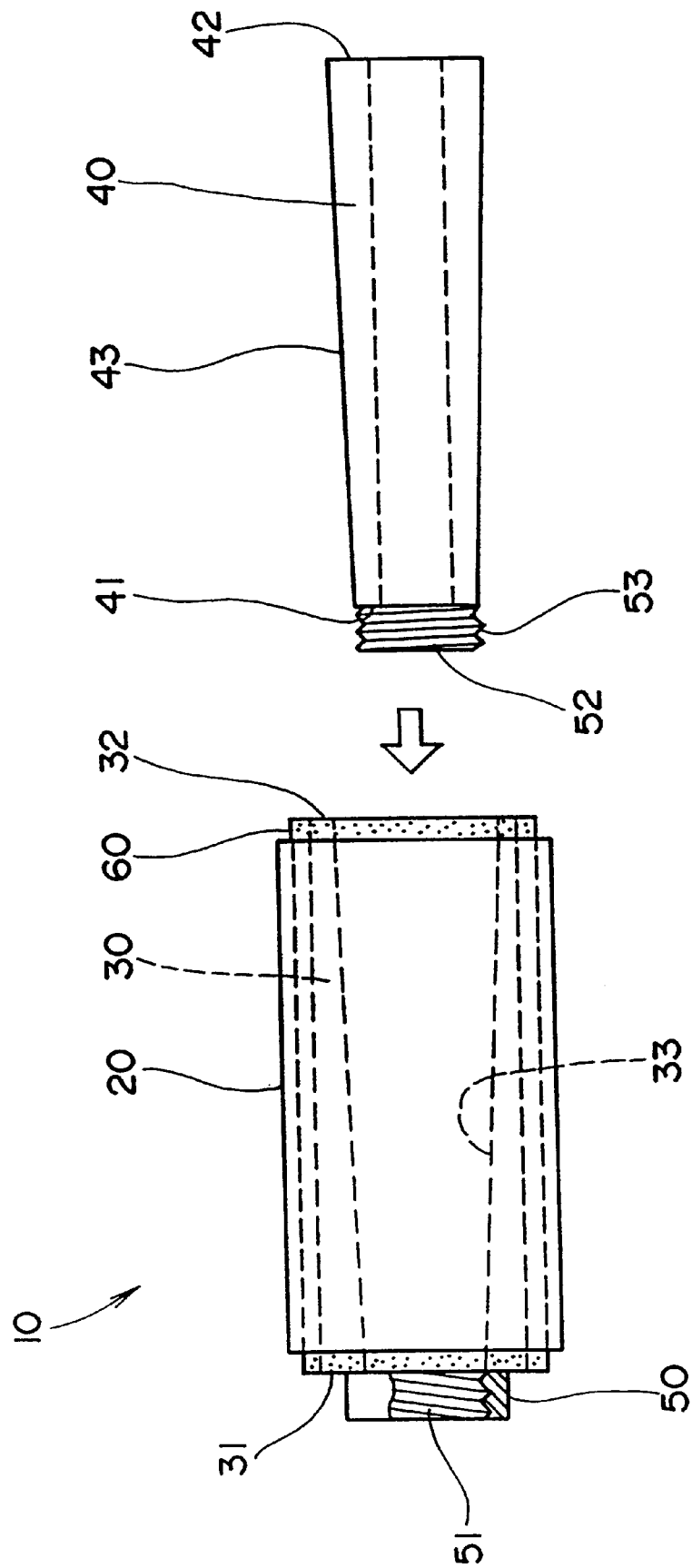
FIG. 1 is an exploded side elevational view showing a multi-layer structure roller of a first embodiment according to the present invention.
Figure 2:
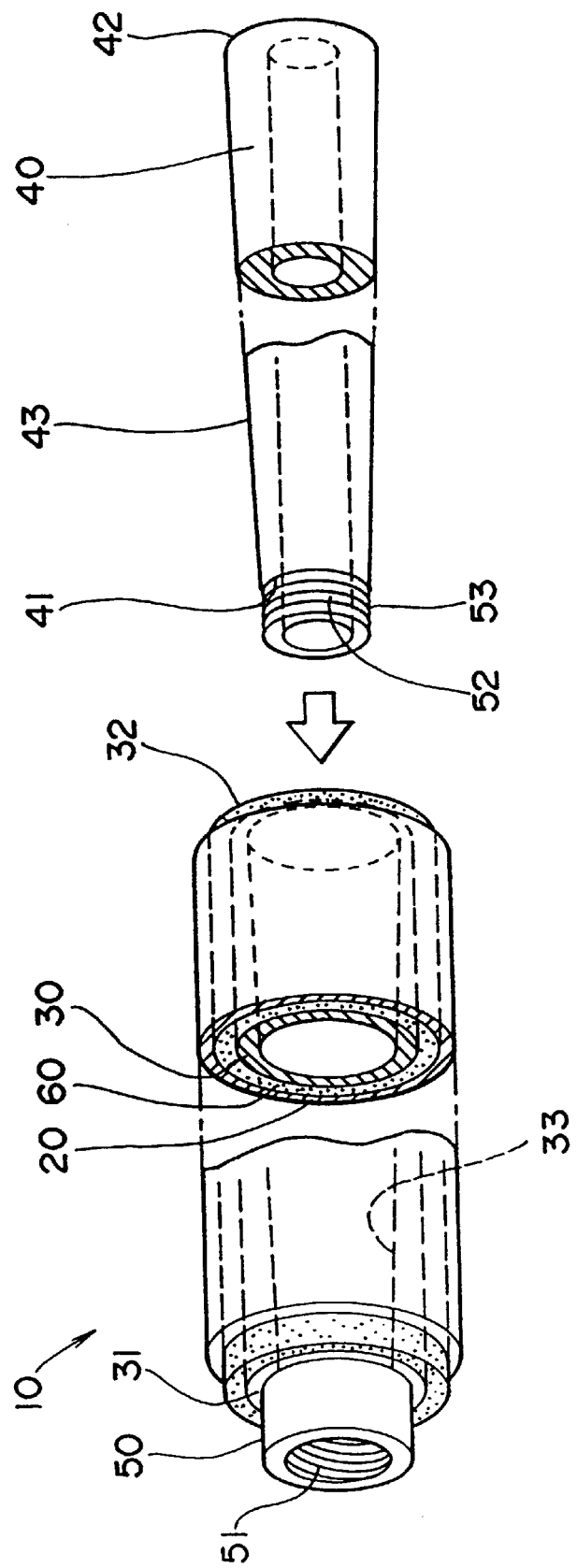
FIG. 2 is an exploded perspective view showing the multi-layer structure roller of the first embodiment.
Figure 3:
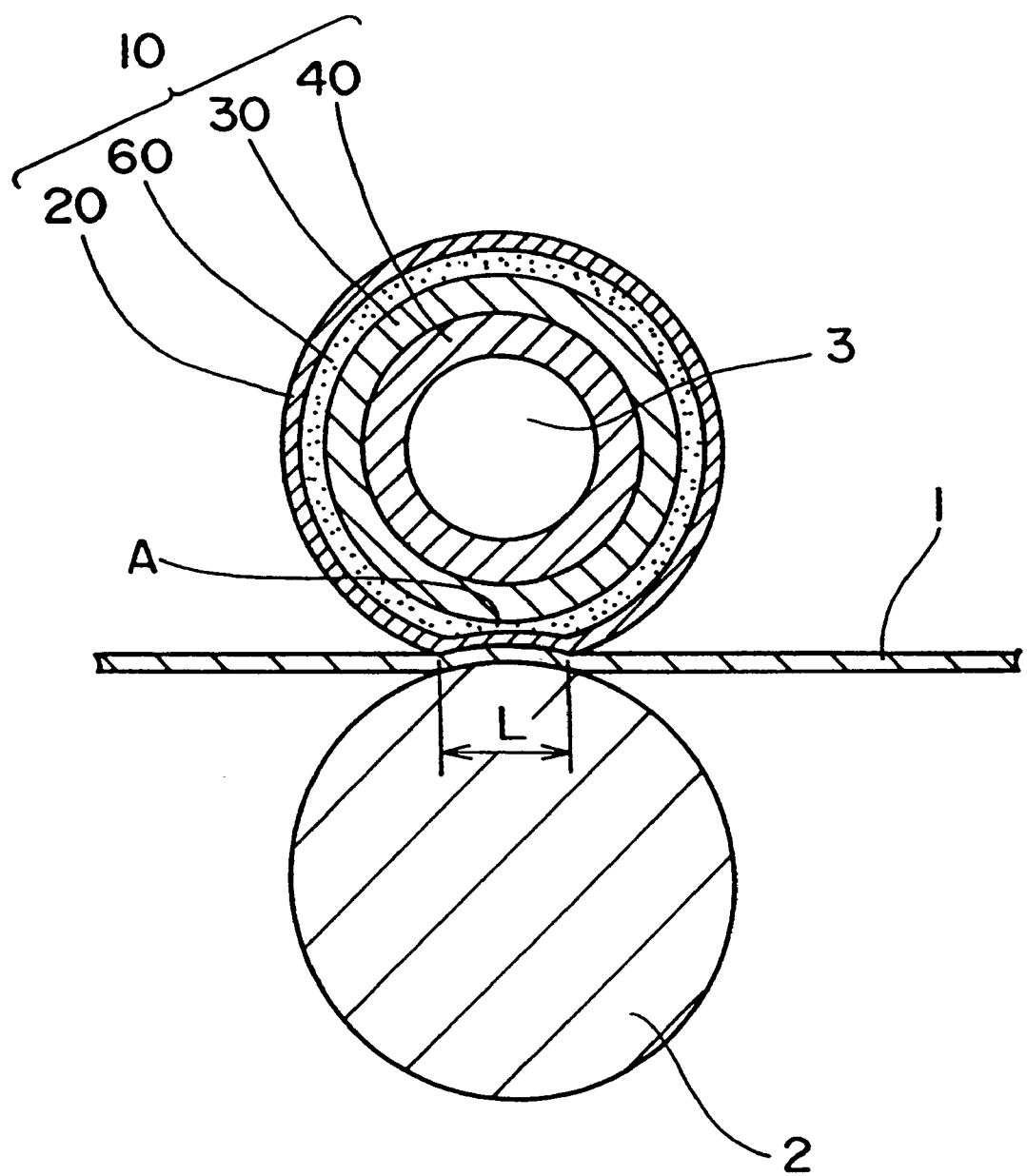
FIG. 3 is a sectional view showing the operating state of the multi-layer structure roller of the first embodiment.

FIG. 1 and FIG. 2 show respectively an exploded side elevational view and an exploded perspective view of a multi-layer structure roller 10 according to the first embodiment. FIG. 3 shows the multi-layer structure roller 10 in operation.

As shown in FIG. 3, the multi-layer structure roller 10 is of a roller used in order to carry out a polishing (gloss) process or an embossing (grained pattern) process on the surface of a thermoplastic resin sheet (or film) 1.

The multi-layer structure roller 10 is a multi-layer structure composed a tubular-shaped outer cylinder section 20 placed at the outer-most side, a tubular-shaped elastic body 60 placed on the inside of the outer cylinder section 20, a tubular-shaped metal-made middle cylinder section 30 placed on the inside of the elastic body 60, and a tubular-shaped metal inner cylinder section 40 placed on the inside of the middle cylinder section 30.

The outer cylinder section 20 is made of metal to have a tubular-shape, but may also be a tubular-shape formed by welding a metal plate.

For example, when the multi-layer structure roller 10 is used for the polishing (gloss) process, it may be made of stainless (SUS), in which the roller has a seamless surface (being not welded) and a mirror face having less than the surface roughness of 5S.

Further, when the multi-layer structure roller 10 is used for the embossing (grained pattern) process, it may be formed to be tubular by welding the two mutually faced sides of an electro-formed surface emboss plate made of nickel.

The thickness of the outer cylinder section 20 is desirably less than 1 mm, more preferably, less than 0.8 mm. A thickness of more than 1 mm causes the outer cylinder section to become easily deformed.

The elastic body 60 is previously laminated on the side of the outer circumference of the middle cylinder section 30.

The elastic body 60 is defined as rubber having a degree of hardness of more than 20 but less than 100 (the value measured with a rubber JIS hardness meter), for example, heat-resistant rubber, such as silicon rubber, fluoro-rubber, urethane rubber, neoprene rubber and so on, can be desirably used.

And further, it is advisable that metal powder is added into the elastic body 10 in order to improve heat-transfer.

The thickness of the elastic body 60 is not limited, but it is desirable to be formed at less than 10 mm from the view of the heat-transfer.

The configuration of the outer circumference of the middle cylinder section 30 is an almost complete cylinder having a flat surfaced outer circumference configuration.

The middle cylinder section 30 is provided on its inner circumference with a taper 33 expanding from an opening end portion 31 located at the end (the left side of FIG. 1) toward an opening end portion 32 located at the opposite end (the right side of FIG. 1).

In the state that the elastic body 60 is laminated on the outer circumference of the middle cylinder section 30, the outer diameter of the elastic body 60 is, in the room temperature, smaller than the inner diameter of the outer cylinder section 20, in which the laminated elastic body 60 and middle cylinder section 30 can be inserted into the inside of the outer cylinder section 20.

The coefficient of linear expansion of the middle cylinder section 30 is greater than the coefficient of linear expansion of the outer cylinder section 20, in which the middle cylinder section 30 and the outer cylinder section 20 are certainly coupled by means of using the difference in heat-expansion caused by heating both cylinder sections in the state in which the middle cylinder section 30 and the outer cylinder section 20 sandwiches the elastic body 60 to be laminated.

Here, the coefficient of linear expansion is, for example, $10.35 \times 10^{-6}/K$ in the case of using nickel (Ni), $23.60 \times 10^{-6}/K$ in the case of using aluminum (Al), and $11.8 \times 10^{-6}/K$ in the case of using iron (Fe).

The configuration of the inner circumference of the inner cylinder section 40 is an almost complete cylinder having a flat surfaced inner circumference configuration.

The inner cylinder section 40 is provided on its outer circumference with a taper 43 extending from an opening end portion 41 located at the end (the left side of FIG. 1) toward an opening end portion 42 located at the opposite end (the right side of FIG. 1).

The positions of the taper 33 of the inner circumference side of the middle cylinder section 30 and the taper 43 of the outer circumference side of the inner cylinder section 40 are defined to fit with the taper 33 of the middle cylinder section 30, going in the coupled position with the outer cylinder section 20 by heatedly expanding, and the taper 43 of the inner cylinder section 40, going in the cooling shrinkage condition or the room-temperature condition. The middle cylinder section 30 and the inner cylinder section 40 are a combination in the adjusted condition of the tapers 33 and 43 by means of use of shrinkage produced when the middle cylinder section 30 cools down to the room-temperature. That is, when the middle cylinder section 30 expanded with heating is to be shrank while cooling down to room-temperature, the middle cylinder section 30 is defined as the condition of non-margin for shrinking, thereby the shrinkage of the middle cylinder section 30 is added to the outer circumference side of the inner cylinder section 40, resulting in the combination. Incidentally, the middle cylinder section 30 does not have the margin for shrinking when the middle cylinder section 30 and the outer cylinder section 20 cool down to room-temperature, therefore, the securely coupled condition of the middle cylinder section 30 and the outer cylinder section 20 (the coupled condition whereby the elastic body 60 is sandwiched between the outer cylinder section 20 and the middle cylinder section 30) remains.

The taper 33 of the middle cylinder section 30 and the taper 43 of the inner cylinder section 40 have desirably a 0.5- to 30-degree slant, more preferably, a 0.5- to 5-degree slant. Less than a 0.5-degree slant does not enable the inner cylinder section 40 to be smoothly inserted into the inside of the middle cylinder section 30, and further, more than a 30-degree slant causes a fluid channel 3 (see FIG. 3) for a heating medium and a cooling medium, which is formed in the hollow portion inside of the inner cylinder section 40, to be narrow, otherwise the ratio of the thickness of the inner cylinder section 40 and the middle cylinder section 30 is greatly changed along the axial direction of the roller, with the result that the difference of the surface temperature of the roller is produced in the axial direction.

The opening end portion 31, located at the inner smaller diameter side of the middle cylinder section 30, is provided with a disjoin-inhibiting ring 50 for preventing the inner cylinder section 40 from disjoining, in which a female screw 51 is cut on the inner circumference side of the disjoin-inhibiting ring 50.

The opening end portion 41, located at the inner smaller diameter side of the inner cylinder section 40 is provided with a disjoin-inhibiting screw groove portion 53 having a male screw 52 which is engaged with the female screw 51 of the disjoin-inhibiting ring 50.

In the embodiment, the multi-layer structure roller 10 is produced as in the following.

The elastic body 60 is initially laminated on the outer circumference side of the middle cylinder section 30 being a greater coefficient of linear expansion than the outer cylinder section 20 to be integral, and further, at room temperature, the elastic body 60 and the middle cylinder section 30, which are in the laminated state, are inserted into the inside of the outer cylinder section 20. The outer cylinder section 20 and the middle cylinder section 30 are coupled by means of the difference in heat-expansion caused by being heated during the state that the elastic body 60 is sandwiched between the outer cylinder section 20 and the middle cylinder section 30.

The inner cylinder section 40, going inserted into the inside of the middle cylinder section 30, is ready, and further, the tapers 33 and 43 are respectively provided on the inner circumference side of the middle cylinder section 30 and the outer circumference side of the inner cylinder section 40. Here, the taper 33, of the middle cylinder section 30 which is completely coupled with the outer cylinder section 20 to sandwich the elastic body 60 by expanding with heat, and the taper 43, of the inner cylinder section 40 which is in the cooling shrinkage state or the room-temperature state, are defined to be mutually fitted.

After that, the inner cylinder section 40, which is in the cooling shrinkage state or the room-temperature state, is inserted into the inside of the middle cylinder section 30 certainly coupled with the outer cylinder section 20 to sandwich the elastic body 60 by expanding with heat, simultaneously, the female screw 51 of the disjoin-inhibiting ring 50 and the male screw 52 of the disjoin-inhibiting screw groove portion 53 are engaged. During the state the tapers 33 and 43 are fitted as described above, the outer cylinder section 20 and the middle cylinder section 30 are cooled down to room temperature (when the inner cylinder section 40 is in the cooling shrinkage state, the inner cylinder section 40 is to be in the room-temperature state), thereby the middle cylinder section 30 and the inner cylinder section 40 are mutually combined by using the shrinking force produced when the middle cylinder section 30 is cooled down to room temperature.

In the aforementioned circumstances, the produce of the multi-layer structure roller 10, having the multi-layer structure composed of the outer cylinder section 20, the elastic body 60, the middle cylinder section 30 and the inner cylinder section 40, is completed.

Next, the operating status of the multi-layer structure roller 10 produced as described thus far will be explained with reference to FIG. 3.

Between the multi-layer structure roller 10 and another metal roller 2, a thermoplastic resin sheet 1 as a processing subject is pressed. Here, either the surface of the multi-layer structure roller 10 or the surface of the metal roller 2 may be a mirror face or an emboss face, otherwise both surfaces of the multi-layer structure roller 10 and the metal roller 2 may be the mirror face or the emboss face.

The multi-layer structure roller 10 and the metal roller 2 are pressed on the sheet 1, whereby the polishing or the emboss pattern on the surface of the multi-layer structure roller 10 and/or the metal roller 2 is transferred onto the sheet 1. At this time, part A (in the drawing) of the elastic body 60 of the multi-layer structure roller 10 is elastically deformed, whereupon the outer cylinder section 20 is deformed. Therefore, a surface-rolled area between the multi-layer structure roller 10 and the metal roller 2, during the state in which the sheet 1 is pressed between the multi-layer structure roller 10 and the metal roller 2, is rolled on the surface, in which a wide pressured area L capable of obtaining sufficient transfer is formed.

Incidentally, the hollow portion, formed in the inside of the inner cylinder section 40, is used as the fluid channel 3 for the heating medium and cooling medium.

According to the embodiment as described thus far, the following are listed as the effects.

That is, for providing the elastic body 60, the surface-rolled area between the multi-layer structure roller 10 and the sheet 1 becomes rolled on the surface by the elastic deformation of the elastic body 60, thereby the polishing or the emboss pattern on the surface of the outer cylinder section 20 (or the polishing or the emboss pattern on the surface of the metal roller 2) can be sufficiently transferred onto the sheet 1, resulting in a high quality sheet 1.

The outer cylinder section 20 is located on the outside of the elastic body 60, so that the sheet 1 does not directly roll the elastic body 60, therefore the aforementioned disadvantage of the occurrence of the rough surface of the sheet 1 or the crumpled state of the sheet 1 (deficient by exfoliation) is resolved.

Figure 7:
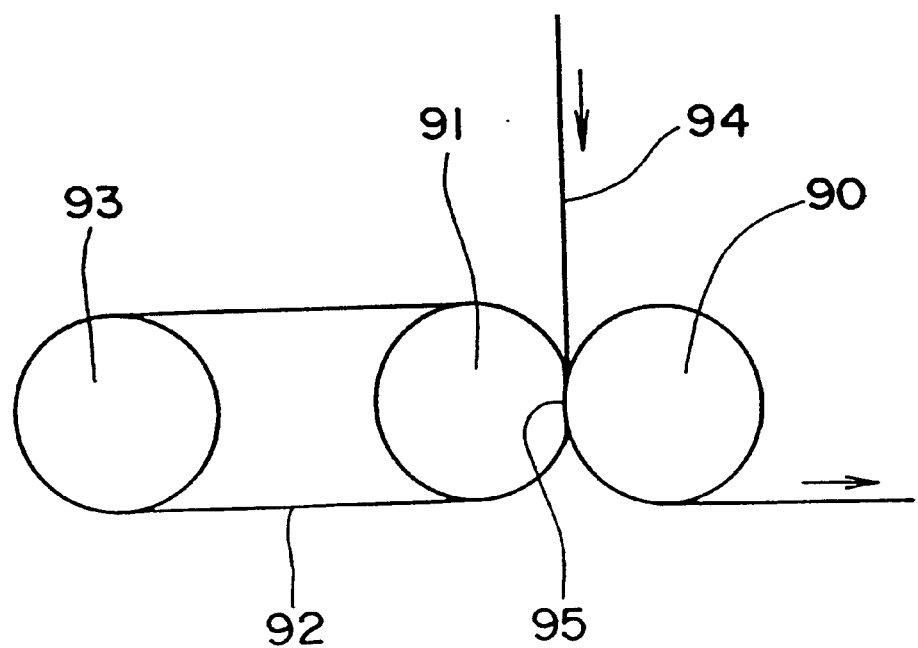
FIG. 7 is a block diagram showing another conventional example.

Further, as compared with the case where the process using a continuous movement through an endless belt 92 shown in FIG. 7 as described above, simplification, smaller size and reduced cost of apparatus can be attained, furthermore, a snake-inhibiting device, for preventing the endless belt 92 from snaking, is not necessary. From the view of needless use of the endless belt 92, the improved endurance and process sequence of the apparatus can be attained.

The elastic body 60 has metal powder added, resulting in high thermal conductivity of the elastic body 60.

The outer cylinder section 20, the elastic body 60, the middle cylinder section 30 and the inner cylinder section 40, which are the components that make up the multi-layer structure roller 10, are reliably joined with one another, whereby a disadvantage, for example, the joint among each component does not loosen during the used period of the apparatus, is not produced, with the result that the multi-layer structure roller 10 is attained to be of high quality and high reliability.

Each component is joined by using the expansion and the shrink of each component, therefore, extra members for joining, such as a bolt or a screw, are unnecessary, resulting in the structural simplification of the multi-layer structure roller 10.

Furthermore, the tapers 33 and 43 are respectively provided on the inner circumference of the middle cylinder section 30 and the outer circumference of the inner cylinder section 40, so that the inner cylinder section 40 can be smoothly inserted into the inside of the middle cylinder section 30, resulting in easy production of the multi-layer structure roller 10.

The disjoin-inhibiting ring 50 is provided at the opening end portion 31 of the middle cylinder section 30, and further the disjoin-inhibiting screw groove portion 53 is provided at the opening end portion 41 of the inner cylinder section 40, whereby the inner cylinder section 40 can certainly be prevented from disjoining from the middle cylinder section 30, resulting in further improvement in the high quality and high reliability of the multi-layer structure roller 10.

Incidentally, the present invention is not intended to be limited to the aforementioned embodiment, and various changes or the like may be made therein without departing from the spirit of the present invention. Such changes are also included in the scope of the present invention.

More specifically, in the embodiment, the multi-layer structure roller 10 has been defined as a roller in order to carry out the polishing (gloss) process or the embossing (grained pattern) process on the surface of the thermoplastic resin sheet 1, the multi-layer structure roller 10 according to the present invention, however, can widely be applied for other used multi-layer structure rollers having similar multi-layer structure. For instance, the multi-layer structure roller can be applied as a roller for forming an extremely thin film, or not only a roller for forming a film or processing a thermoplastic resin sheet, but also a roller for a printing machine or a pressuring roller or a sending roller for various devices.

The disjoin-inhibiting ring 50 and the disjoin-inhibiting screw groove portion 53 provided in the aforementioned embodiment are not absolutely necessary. However, it is advisable that the inner cylinder section 40 is further completely prevented from disjoining by providing the disjoin-inhibiting ring 50 and the disjoin-inhibiting screw groove portion 53.

The elastic body 60 has been defined as rubber in the aforementioned embodiment, the elastic body 60 may be defined as another material, provided that the material is capable of elastically changing.

EXAMPLE 1

On the basis of the first embodiment, the multi-layer structure roller 10 is actually produced under the following conditions.

The following, initially, are ready as the components that make up the multi-layer structure roller 10.

The outer cylinder section 20 is a forged part of the precipitation hardening type which is made of stainless (SUS), a seamless surface, a thickness of 0.6 mm, an inner diameter of φ286.2 mm, and an outer circumference surface roughness of 0.1 S.

The elastic body 60 is formed by coating rubber (in which metal powder is added with silicon rubber), having a thickness of 10 mm, on the outer circumference of the middle cylinder section 30.

The middle cylinder section 30 is made of aluminum and has an outer diameter of φ265.6 mm, an inner diameter of φ238 mm at the opening end portion 32 of the larger diameter side, and the slant degree of the taper 1.

The inner cylinder section 40 is made of SS steel (SS41) and has n outer diameter of φ238.6 at the opening end portion 42 of the larger diameter side, the slant degree of the taper 1, and the inner diameter (straight) of φ180 mm.

Further, the disjoin-inhibiting ring 50 is provided on the opening end portion 31 of the middle cylinder section 30, and the disjoin-inhibiting screw groove portion 53 is provided on the opening end portion 41 of the inner cylinder section 40.

The multi-layer structure roller 10 was produced with the aforementioned components by the following method.

The middle cylinder section 30 coated with the elastic body 60 is inserted into the inside of the outer cylinder section 20 at room temperature to be mutually laminated, and is heated at 200° C. during the laminated condition.

The inner cylinder section 40 is previously cooled at 20° C., and the cooled inner cylinder section 40 is inserted into the inside of the middle cylinder section 30 (certainly coupled with the outer cylinder section 20 to sandwich the elastic body 60) heated at 200° C., continuously, the disjoin-inhibiting ring 50 and the disjoin-inhibiting screw groove portion 53 are fixedly screwed.

After that each component is cooled until the room temperature is integrated, and the multi-layer structure roller 10 is completed.

By producing the multi-layer structure roller 10 under the conditions as in the aforementioned embodiment, the multi-layer structure roller 10, having the required functions such as an elastically changing function or exfoliation-inhibiting function, is formed with reliability. Provided that the thermoplastic resin sheet 1 is processed when using the multi-layer structure roller 10, the high quality sheet 1, transferred thereon with the polishing on the surface of the outer cylinder section 20, can be obtained, with the result that the effects according to the present invention are noticeably conceded.

Second Embodiment

Figure 4:
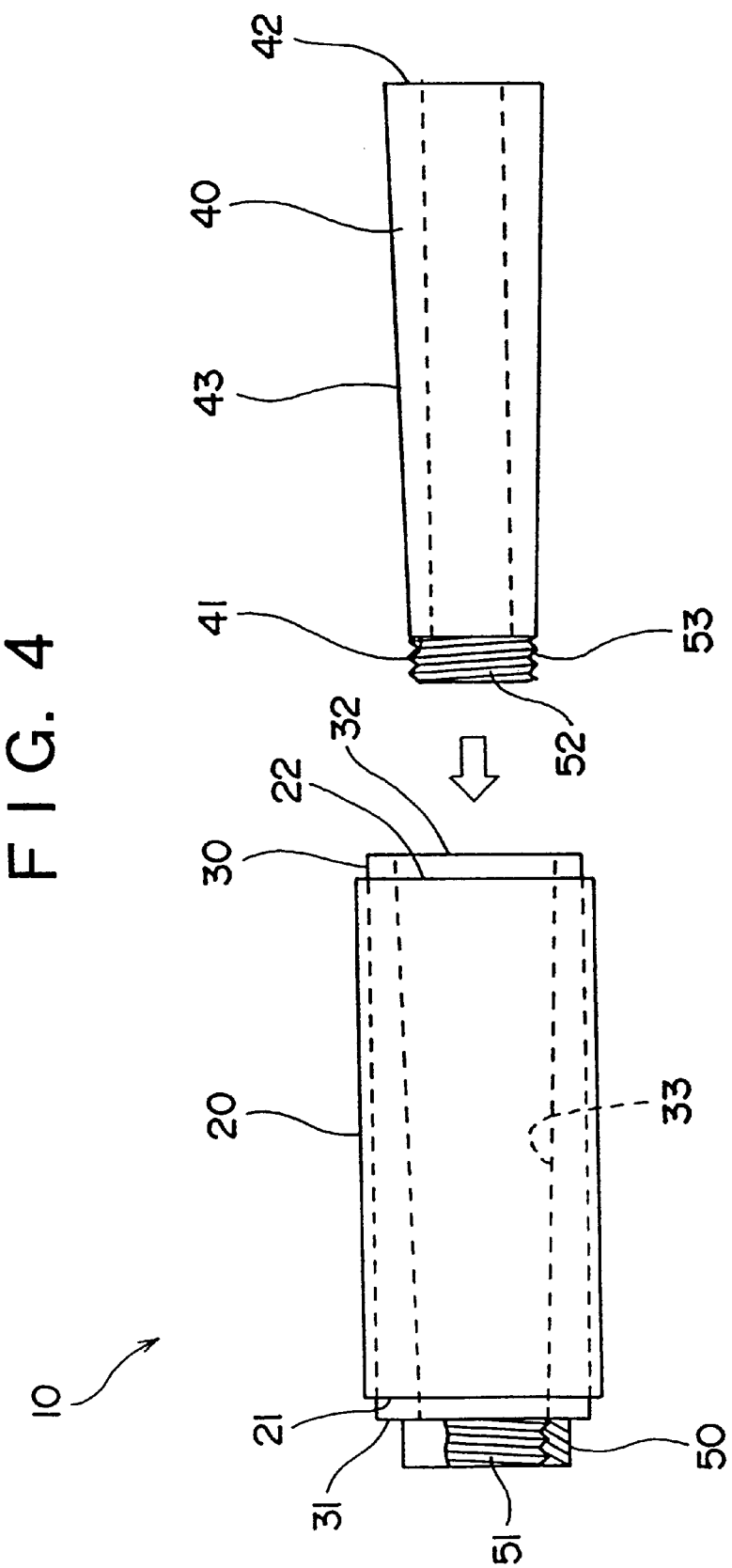
FIG. 4 is an exploded side elevational view showing a multi-layer structure roller of a second embodiment according to the present invention.
Figure 5:
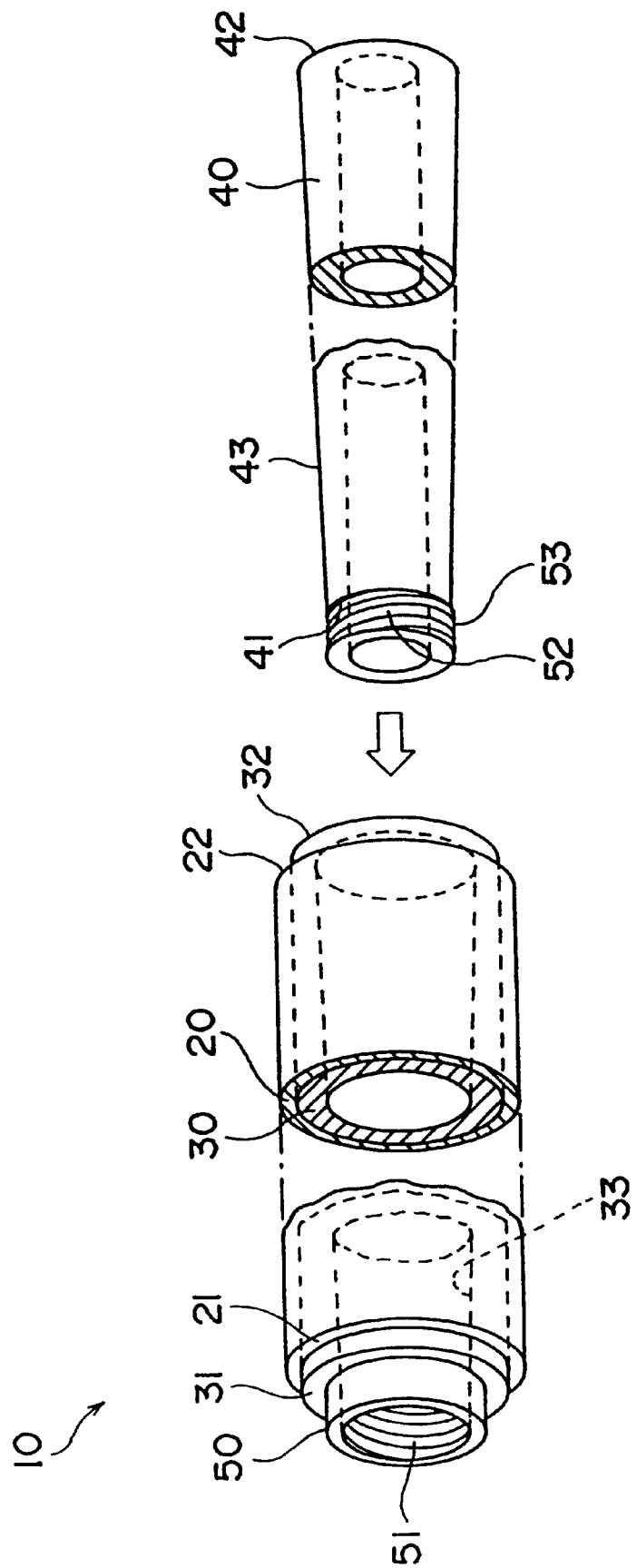
FIG. 5 is an exploded perspective view of the multi-layer structure roller of the second embodiment.
Figure 6:
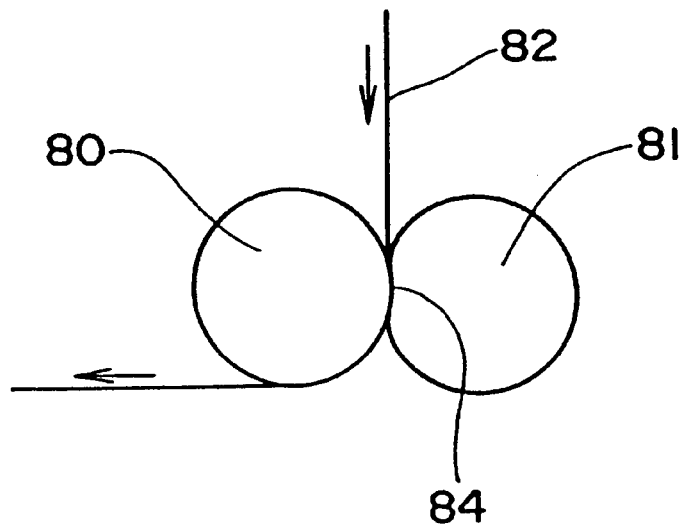
FIG. 6 is a block diagram showing a conventional example.

FIG. 4 and FIG. 5 show respectively an exploded side elevational view and an exploded perspective view of a micro-emboss roller 10 as with the multi-layer structure roller according to a second embodiment.

The micro-emboss roller 10 is used for producing a micro-emboss sheet or a prism sheet which is formed with a fine emboss on the surface of the thermoplastic resin sheet (or film). The micro-emboss sheet is formed by carrying out the emboss process (grained pattern) on the surface of the thermoplastic resin sheet by pressing the rotating micro-emboss roller 10 onto the thermoplastic resin sheet (or film).

The micro-emboss roller 10 is composed of a tubular-shaped outer cylinder section 20, a tubular-shaped middle cylinder section 30 inserted into the inside of the outer cylinder section 30, and a tubular-shaped inner cylinder section 40 inserted into the inside of the middle cylinder section 30.

The outer cylinder section 20 is formed to be tubular shaped by welding the two mutually opposed sides of a metal micro-emboss plate (which is formed with a fine emboss of approximately 10–100 μm on the surface of the metal plate). The circulate length of the opening end portions 21 and 22, formed on both sides (the right and left sides of FIG. 1) of the outer cylinder section 20, are approximately the same.

The configuration of the outer circumference side of the middle cylinder section 30 is an almost complete tubular outer circumference surface configuration.

The middle cylinder section 30 is provided on its inner circumference with the taper 33 extending from one end (the left side of FIG. 1) of the opening end portion 31 toward the other end (the right side of FIG. 1) of the opening end portion 32.

The outer diameter of the middle cylinder section 30 is, at room temperature, smaller than the inner diameter of the outer cylinder section 20, in which the middle cylinder section 30 can be inserted into the inside of the outer cylinder section 20.

The coefficient of linear expansion of the middle cylinder section 30 is greater than the coefficient in linear expansion of the outer cylinder section 20, in which the outer cylinder section 20 and the middle cylinder section 30 are certainly coupled with each other by using the difference of heat-expansion caused by heating the laminated outer cylinder section 20 and middle cylinder section 30.

Here, the coefficient of linear expansion is defined as, for example, $10.35 \times 10^{-6}$/K in the case of nickel (Ni), $23.60 \times 10^{-6}$/K in the case of aluminum (Al), $11.8 \times 10^{-6}$/K in the case of iron (Fe).

The configuration of the inner circumference side of the inner cylinder section 40 is an almost complete tubular outer circumference surface configuration.

The inner cylinder section 40 is provided on its outer circumference with the taper 43 extending from one end (the left side of FIG. 1) of the opening end portion 41 toward the other end (the right side of FIG. 1) of the opening end portion 42.

The taper 33, provided on the inner circumference side of the middle cylinder section 30, and the taper 43, provided on the outer circumference side of the inner cylinder section 40, are defined as a location in which the taper 33 of the middle cylinder section 30 securely coupled with the outer cylinder section 20 by expanding with heat, and the taper 43 of the inner cylinder section 40 being in the cooling shrinking state or the room-temperature state. The middle cylinder section 30 and the inner cylinder section 40 are combined by using shrinking force produced when the middle cylinder section 30 is changed to be in the room temperature state during the mutually fitted state of the aforementioned tapers 33 and 43. That is, the middle cylinder section 30 expanded with heating shrinks when cooling down to room temperature, at this time, the state without the shrinking margin causes the shrinking force of the middle cylinder section 30 to add to the outer circumference side of the inner cylinder section 40 to be integrated. Incidentally, even when the middle cylinder section 30 and the outer cylinder section 20 cool down to room temperature, the middle cylinder section 30 does not have a shrinking margin, so that the coupled condition between the middle cylinder section 30 and the outer cylinder section 20 remains.

The taper 33 of the middle cylinder section 30 and the taper 43 of the inner cylinder section 40 have desirably a 0.5 to 30-degree slant, more preferably, a 0.5 to 5-degree slant. Less than a 0.5-degree slant does not enable the inner cylinder section 40 to be smoothly inserted into the inside of the middle cylinder section 30, and further, more than a 30-degree slant causes the fluid channel 3 (see FIG. 3) used as a heating medium and cooling medium, which is formed in the hollow portion inside the inner cylinder section 40, to narrow, otherwise the ratio of the thickness of the inner cylinder section 40 and the middle cylinder section 30 is greatly changed along the axial direction of the roller, with the result that the difference in the surface temperature of the roller is produced in the axial direction.

The opening end portion 31, located at the inner smaller diameter side of the middle cylinder section 30, is provided with the disjoin-inhibiting ring 50 for preventing the inner cylinder section 40 from disjoining, in which the female screw 51 is cut at the inner circumference side of the disjoin-inhibiting ring 50.

The opening end portion 41, located at the inner smaller diameter side of the inner cylinder section 40 is provided with the disjoin-inhibiting screw groove portion 53 having the male screw 52 which is engaged with the female screw 51 of the disjoin-inhibiting ring 50.

In the embodiment as described thus far, the micro-emboss roller 10 is produced as in the following.

The middle cylinder section 30, having a greater coefficient of linear expansion than the outer cylinder section 20 is inserted into the inside of the outer cylinder section 20, and then the middle cylinder section 30 and the outer cylinder section 20 are completely coupled by using the difference in heat-expansion caused by heating the middle cylinder section 30 and the outer cylinder section 20 in the mutually laminated state.

The inner cylinder section 40, going to be inserted into the inside of the middle cylinder section 30, is ready, and further, the tapers 33 and 43 are respectively provided on the inner circumference side of the middle cylinder section 30 and the outer circumference side of the inner cylinder section 40. Here, the taper 33, of the middle cylinder section 30 which is completely coupled with the outer cylinder section 20 by expanding with heating to sandwich the elastic body 60, and the taper 43, of the inner cylinder section 40 which is in the cooling shrinkage state or the room-temperature state, are defined to be mutually fitted.

Continuously, the inner cylinder section 40, going to be in the cooling shrinking state or the room-temperature state, is inserted into the inside of the middle cylinder section 30 coupled with the outer cylinder section 20 by expanding with heating, simultaneously, the female screw 51 of the disjoin-inhibiting ring 50 and the male screw 52 of the disjoin-inhibiting screw groove portion 53 are engaged. In the state the tapers 33 and 43 are fitted as described above, the outer cylinder section 20 and the middle cylinder section 30 are cooled down to room temperature (when the inner cylinder section 40 is in the cooling shrinking state, the inner cylinder section 40 is changed to the room-temperature state) to combine the middle cylinder section 30 and the inner cylinder section 40 by using the shrinking force produced when the middle cylinder section 30 is changed to the room-temperature state.

As described thus, the production of the micro-emboss roller 10, having the multi-layer structure composed of the outer cylinder section 20, the middle cylinder section 30 and the inner cylinder section 40, finishes.

According to the embodiment, the following effects are listed.

That is, the outer cylinder section 20, the middle cylinder 30 and the inner cylinder section 40, in which structuring each layer of the sectional circular, are certainly combined, resulting in the micro-emboss roller 10 having the high quality and high dependability, which is produced with any disadvantages, for example, the combination among each of the cylinder sections 20, 30 and 40 is disjoined during use.

By forming the micro-emboss roller 10 as described thus far, as compared with the use of the conventional slab-like transferring plate, productivity of the micro-emboss sheet can be increased.

The combination is carried out by using the expansion or shrinkage of each of the cylinder sections 20, 30 and 40, thereby the extra member for joining, such as a bolt or a screw, is not needed, resulting in simplification of the structure of the micro-emboss roller 10.

The tapers 33 and 43 are respectively provided on the inner circumference of the middle cylinder section 30 and the outer circumference of the inner cylinder section 40, so that the inner cylinder section 40 is smoothly inserted into the inside of the middle cylinder section 30, resulting in the easy production of the micro-emboss roller 10.

The disjoin-inhibiting ring 50 is provided at the opening end portion 31 of the middle cylinder section 30, and further the disjoin-inhibiting screw groove portion 53 is provided at the opening end portion 41 of the inner cylinder section 40, thereby the inner cylinder section 40 is further securely prevented from disjoining from the middle cylinder section 30, resulting in the higher quality and higher dependability of the micro-emboss roller 10.

Incidentally, the present invention is not intended to be limited to the aforementioned embodiment, and various changes may be made therein without departing from the spirit of the present invention. Such changes are also included in the scope of the present invention.

In the aforementioned embodiment, the present invention is applied for forming the micro-emboss roller 10, the multi-layer structure roller according to the present invention, however, is capable of being widely applied for a multi-layer roller having a similar multi-layer structure.

The disjoin-inhibiting ring 50 and the disjoin-inhibiting screw groove portion 53 are provided in the aforementioned embodiment, but it is not always necessary for them to be provided. It is, however, advisable that the disjoin-inhibiting ring 50 and the disjoin-inhibiting screw groove portion 53 are provided from the point of further secureness of prevention from disjoining.

EXAMPLE 2

On the basis of the second embodiment, the micro-emboss roller 10 is actually produced under the following conditions.

The outer cylinder section 20 is to be a tubular by welding mutually two shorter sides of a rectangle of a nickel-made plate of 0.6 mm thickness by argon welding. The outer cylinder section 20 is defined as the inner diameter of 143.1 mm, and the face length (the length in the direction along the central axis of the roller) of 220 mm at room temperature.

The middle cylinder section 30 is tubular (pipe)-shaped made of aluminum (5052), and defined as, at room temperature, the outer diameter of 142.8 mm, the face length of 250 mm, the inner diameters of 110.25 mm upto one opening end portion 31 and 119 mm until the other opening end portion 32, and the slant degree of the taper 1.

The inner cylinder section 40 is tubular (pipe)-shaped made of SS steel (SS41), and defined as, at room temperature, the outer diameter of 110.55 mm upto one opening end portion 41 and 119.3 mm upto the other opening end portion 42, the slant degree of the taper 1, the inner diameter of 50 mm, and the face length of 250 mm (the length of 30 mm of the disjoin-inhibiting screw groove portion 53 is added to this face length).

After the middle cylinder section 30 is inserted into the inside of the outer cylinder section 20 at room temperature, the outer cylinder section 20 and the middle cylinder section 30 are coupled by heating both cylinder sections 20 and 30 at 150° C. As described in the aforementioned embodiment, the disjoin-inhibiting ring 50 and the disjoin-inhibiting screw groove portion 53 are provided to secure the middle cylinder section 30 and the inner cylinder section 40.

By producing the micro-emboss roller 10 under the condition as illustrated in the embodiment, the high quality and high dependability of the micro-emboss roller 10 can be formed, whereby the effects of the present invention are noticeably indicated.

What is claimed is:

1. A method for producing a multi-layer structure roller, comprising the steps of:

inserting a tubular-shaped middle cylinder section, having a greater coefficient of linear expansion than a tubular-shaped metal-made outer cylinder section, inside of the tubular-shaped metal-made outer cylinder section located at an outer-most position;

coupling the outer cylinder section and the middle cylinder section by using a difference in heat expansion caused when the outer cylinder section and the middle cylinder section are heated in a laminated state;

providing tapers at an inner circumference of the middle cylinder section and at an outer circumference of a tubular-shaped inner cylinder section, the tubular-shaped inner cylinder section inside of the middle cylinder section;

fitting the taper at the inner circumference of the middle cylinder section to the taper at the outer circumference of the inner cylinder section by expanding with heating the middle cylinder section, the taper of the inner cylinder section being at room-temperature; and combining the middle cylinder section and the inserted inner cylinder section, the middle cylinder section being cooled to room-temperature, while the tapers are fitted to each other.

2. The method producing the multi-layer structure roller according to claim 1, further comprising the steps of:

attaching an elastic body to a surface on the outer circumference of the middle cylinder section; and coupling the outer cylinder section and the middle cylinder section by using a difference in heat expansion caused by the heating of both of the cylinder sections sandwiching the elastic body.

* * * * *